(No Model.)
H. C. WILSON.
POTATO HARVESTER.
No. 504,186. Patented Aug. 29, 1893.
3 Sheets—Sheet 1.
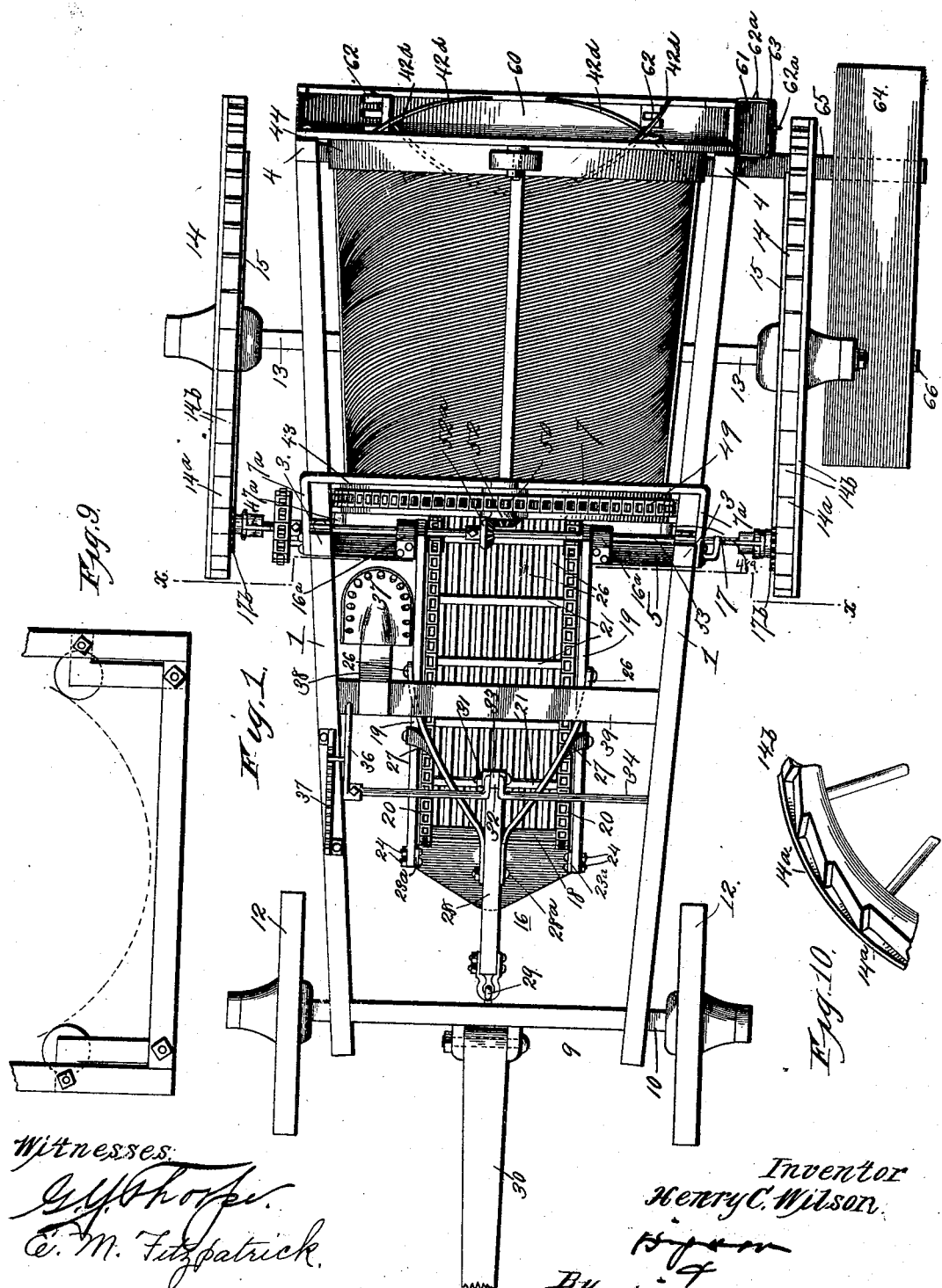
Witnesses:
G. Y. Shoffer.
E. M. Fitzpatrick.
Inventor
Henry C. Wilson.
By _____ Attys.

(No Model.) 3 Sheets—Sheet 2.
H. C. WILSON.
POTATO HARVESTER.
No. 504,186. Patented Aug. 29, 1893.
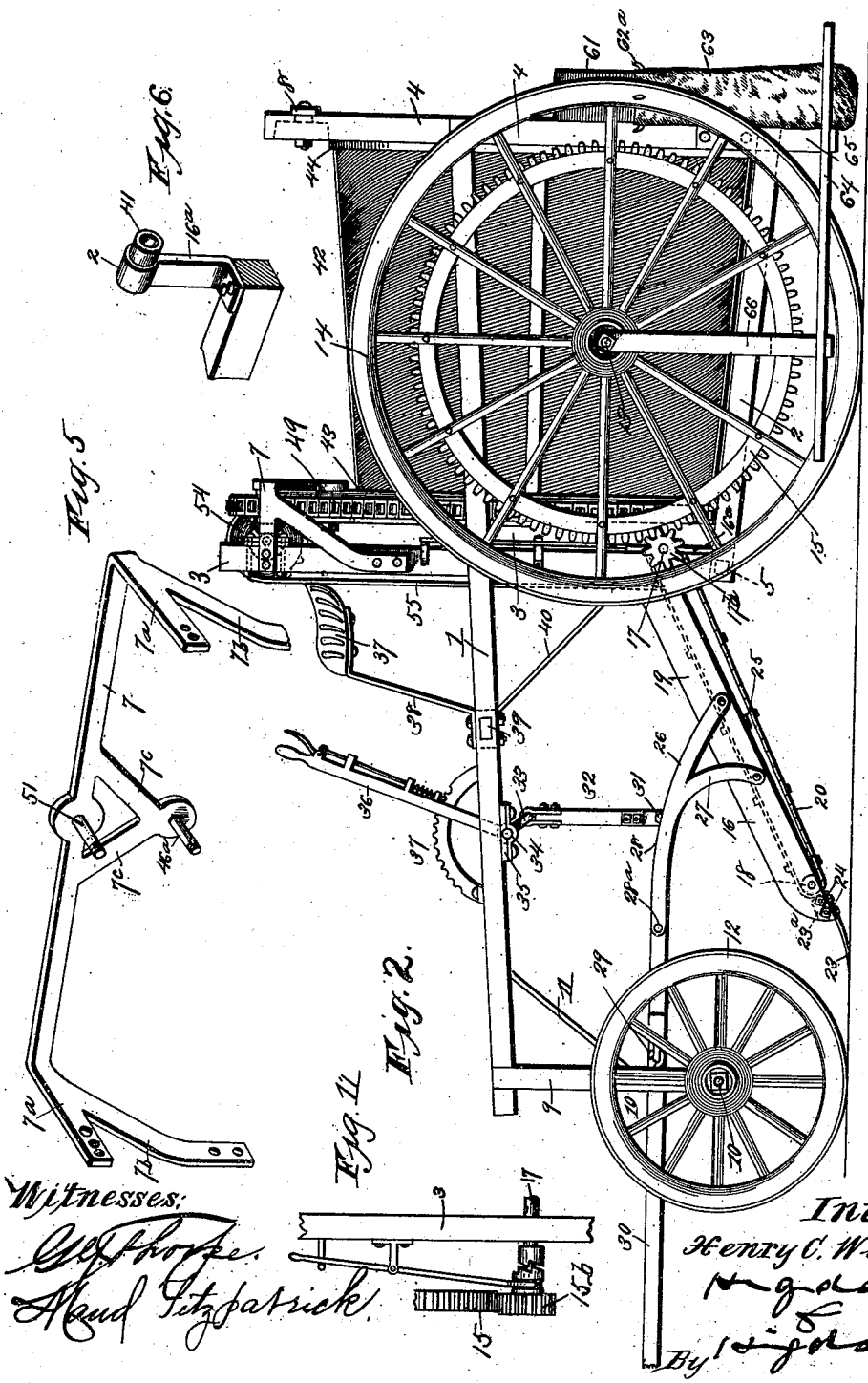
Witnesses:
Inventor,
Henry C. Wilson,
By Higdon & Higdon
Att'ys.

(No Model.)  
H. C. WILSON.  
POTATO HARVESTER.  
No. 504,186. Patented Aug. 29, 1893.
3 Sheets—Sheet 3.
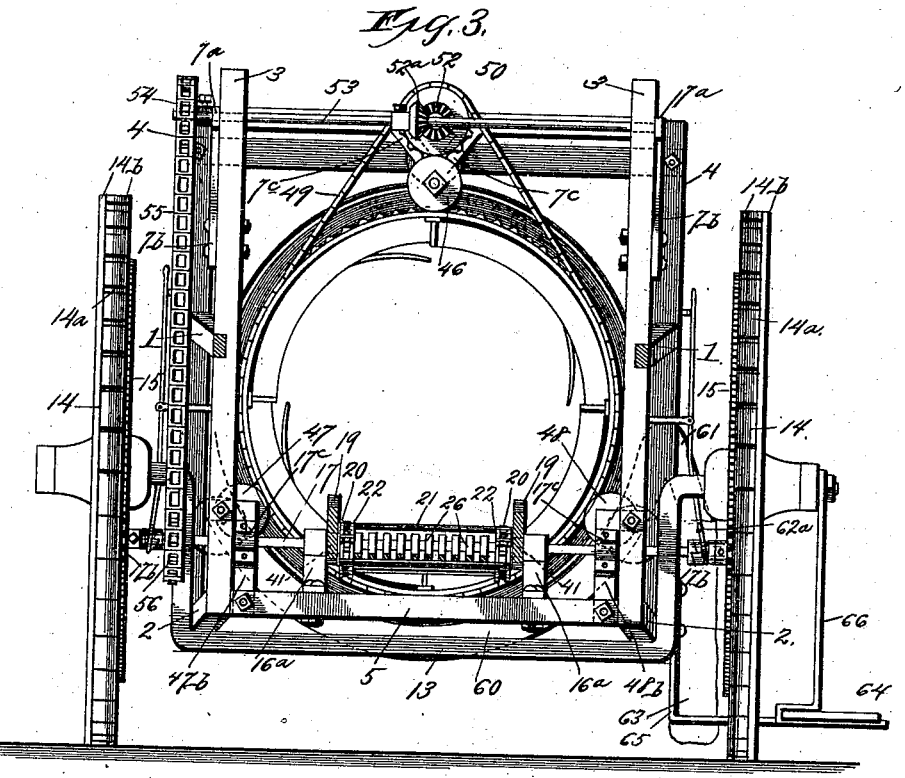
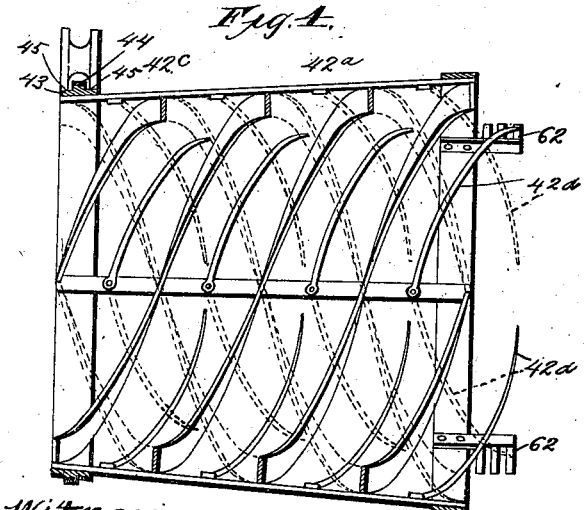
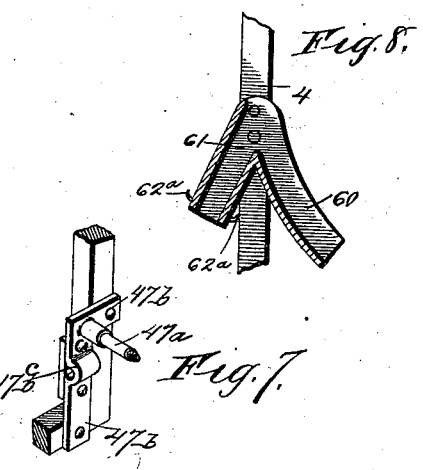
Witnesses:
Inventor:  
Henry C. Wilson  
By Wigmon & Wigmon  
Attys.

UNITED STATES PATENT OFFICE.

HENRY C. WILSON, OF EDWARDSVILLE, KANSAS.

POTATO-HARVESTER.

SPECIFICATION forming part of Letters Patent No. 504,186, dated August 29, 1893.

Application filed September 23, 1892. Serial No. 446,705. (No model.)

*To all whom it may concern:*

Be it known that I, HENRY C. WILSON, of Edwardsville, county of Wyandotte, Kansas, have invented certain new and useful Improvements in Potato-Harvesters, of which the following is a full, clear, and exact description, reference being had to the accompanying drawings, forming a part hereof.

My invention relates to potato harvesters, wherein the potatoes are plowed or scraped up from the hill, and elevated to an open ended separating cylinder, by which means the weeds and dirt are separated from the potatoes, and they are discharged into bags at the rear end of the machine.

The object of my invention is to provide a machine which will effectively perform its work, and will not be unnecessarily heavy, complicated, or hard to pull over the ground, and which will be easily operated and will completely dig up all of the potatoes from the ground, and after thoroughly separating them from the soil, dirt, vines, and weeds deliver them in a clean, marketable condition, in sacks carried upon the machine, and received by an attendant supported upon the machine, as will hereinafter appear.

In the accompanying drawings:—Figure 1. is a plan of a potato harvester embodying my invention. Fig. 2. is a side elevation thereof. Fig. 3. is a vertical transverse section of the machine in line $x\ x$ of Fig. 1. looking toward the rear end of the machine. Fig. 4. is a longitudinal sectional elevation of the frame work of the separating cylinder and its connections with the casing rods, or wires, removed. Fig. 5. is a perspective of the upper forward transverse brace for supporting the upper shaft, the friction roller, and the cylinder operating sprocket wheel. Fig. 6. is a perspective of one of the trunnion brackets for supporting the rear end of the elevator. Fig. 7. is a detail in perspective of one of the angle arm brackets for supporting one of the lower forward friction rollers. Fig. 8. is a detail in section of the upper discharge end, and spout of the trough at the rear end of the machine. Fig. 9. is a detail in elevation of the lower part of the rear end of the cylinder showing its friction roller supports. Fig. 10. is a detail in perspective of a fragment of the wheel rim and tire with its serrated tread. Fig. 11. is a detail view showing the lever and clutch mechanism for throwing the operating mechanism in and out of gear.

The main frame of the machine is composed of upper longitudinal bars, 1, extending from the rear to the front end of the machine, lower converging longitudinal bars, 2, which extend from the rear to the middle part of the machine, and vertical posts, 3 and 4, secured at their lower ends to the lower longitudinal bars and extending above the upper longitudinal bars, and connected at their lower ends by transverse braces, 5 and 6, and at their upper ends by transverse braces, 7 and 8, and are also bolted securely to the upper longitudinal bars. The upper longitudinal bars, 1, are supported at their forward ends upon a deck frame, 9, carrying at its lower end the axle, 10, and braced to the longitudinal bars by a diagonal rod, 11, said axle being supported upon suitable wheels, 12. The rear axle, 13, is cranked to pass beneath the lower longitudinal frame bars, 2, and is securely bolted to said bars, and extends upwardly at each side of the frame to a point about midway between the upper and lower longitudinal bars and has its opposite ends projecting horizontally outward. The axle, 13, carries rear wheels, 14, each carrying a spur gear, 15, which serves to drive the elevator and separating cylinder, and having a serrated periphery, $14^a$, with marginal flanges, $14^b$, as will hereinafter appear.

The elevator frame 16, is composed of the inclined and parallel side-bars 19, which are connected together by transverse or cross-strips 25, and secured longitudinally of the elevator and parallel and in proximity to each other upon the cross-strips 25 are the strips 26; the arrangement being such that the loose earth carried upon the elevator frame will escape between the longitudinal strips 26. The upper or rear ends of the side pieces 19 are loosely mounted upon the hub projections 41 of the bracket bearings $16^a$, which are bolted or otherwise secured upon the cross-bar 5 of the frame-work. A shaft 17 extending horizontally and transversely of the machine is journaled in bearings $17^c$ of supporting brackets secured to the cross-bar 5 and also to the front vertical bars 3.

Secured upon the shaft 17 adjacent to the hub projections 41 of bearing brackets 16ª, are the sprocket pinions 22, and revolubly mounted between the side pieces 19 near their lower ends is a roller 18, which extends transversely of the elevator frame. The elevator proper, is composed of the endless chains 20, which engage with and pass around the sprocket pinions 22 and the roller 18; these chains being connected at suitable intervals by the cross-bars or strips 21. These cross-bars or strips 21 are adapted as the endless elevator or carrier is operated, to move upward upon the longitudinal strips or bars 26, and convey the potatoes to the rotating separator, hereinafter referred to.

To gather or scoop the potatoes from the hills, a shovel 23 is provided; this shovel being secured to the lower ends of the side pieces 19 by bolts 24, which pass through said side pieces and also through the ears 23ª projecting upwardly from said shovel.

To raise the shovel from the ground when necessary or desirable, a toggle-connection is formed between the front axle and the elevator-frame; this toggle consisting of the arm or lever 28, which is provided with an eye or loop at its forward end which engages pivotally a hook 29 carried at the rear side of the front axle.

Pivoted at 28ª at their forward ends to the vertical sides of the arm or lever 28, and about midway of its length, are the link-bars 28ᵇ, which diverge and curve downwardly and rearwardly, and are bifurcated to form the branch-arms 26ª and 27; the lower ends of these arms being bolted or otherwise secured to the sides of the elevator frame. The rear end of the arm or lever 28 is pivotally connected at 31 to the lower end of the link-bar 32. The upper end of the link, 32, is pivotally secured by a strap, 33, to the crank of a rock shaft, 34, supported in bearings, 35, upon the under sides of the longitudinal bars, 1, of the machine, and has a grip pawl hand lever, 36, which engages with the segment rack, 37, also bolted to the longitudinal bars, 1, of the machine, by which means the forked arm, 28ᵇ, and the forward arm 28 of the elevator, 16, may be raised to any required height, and lowered, the toggle joint, at 28ª, permitting the arm 28 to relax, and allow the elevator to be raised.

A seat, 37, for the driver, is supported upon a bracket, 38, upon one side of the machine, and to a transverse bar, 39, which connects the upper longitudinal bars, 1, midway of their length, and also supports the ends of the diagonal, downwardly extending bars, 40, which are provided with bearings, and which fit upon the hub projections, 41, of the brackets, 16ª, which are secured to the forward lower crossbars, 5, and form the trunnions upon which the upper ends of the elevator side pieces, 19, are pivotally supported. These bars not only serve to hold the vertical post, 3, securely in position, but also hold the shaft, 17, securely in place, and the ends of this shaft have fitted upon them pinions, 17ᵇ, which mesh with the spur gear, 15, upon the wheels, 14, and serve to drive the said shaft, and through it operate the elevator chains.

A frusto conical separating cylinder, 42, expanding in diameter from its forward to its rear end, is supported with its longitudinal axis approximately in a horizontal line by friction rollers upon the frame, which bear upon its forward and its rear rims, or peripheries, 43—44, respectively, and extends from the rear vertical post nearly to the forward vertical post, and is, therefore, located in length midway of the axle, 13, and in height its longitudinal axis is less than a foot above the rear wheel axle. The rim of the forward end of the cylinder 43 is formed with sprocket teeth, 44, upon its middle portion, and smooth flanges, 45, upon either side thereof, and grooved friction wheels, 46, 47, 48, supported upon the frame, hold the front end of the cylinder truly in position, to be revolved freely upon said friction rollers by a sprocket chain, 49, passing over a sprocket wheel, 50, supported upon a stub axle, 51, of the brace, 7, as clearly shown in Fig. 5, the said sprocket wheel being geared by miter wheels, 52—52ª, to an upper transverse shaft, 53, supported in bearings in the upper ends of the posts 3, and driven by a sprocket wheel, 54, and chain, 55, which latter extends downwardly and around the sprocket wheel, 56, secured to the shaft, 17, which drives the elevator, and also serves through the means just described, to rotate the cylinder. The brace, 7, at the upper ends of the posts, 3, is held rearwardly of the posts 3 by the bracket arm 7ª 7ª, a sufficient distance to allow the rim of the sprocket pinion, 50, and miter wheels, 52—52ª, to be located between the said brace and the shaft, 53. The upper friction roller, 46, is supported upon a stub axle, 46ª, secured to the lower end of the pendent arms, 7ᶜ, of the brace, 7, and located immediately below the stub axle, 51, of the sprocket wheel, 50. The friction rollers, 47 and 48, are supported upon rearwardly projecting stub axles, 47ª—48ª, upon the opposite lower corners of the frame, and connected by the angle arm, 47ᵇ—48ᵇ, respectively, with a vertical post, 3, and the transverse brace, 5. The friction rollers, 46—47—48, embracing the sprocket teeth, 44, being grooved serve to hold the said cylinder from endwise movement within the frame. The rear end friction rollers, 57—58—59, are supported upon stub axles, 57ª—58ª—59ª, respectively secured to the upper transverse brace, 18, and the vertical posts, 4, in a simple and secure manner, and bear upon the rim, 44, at the rear end of the cylinder, and hold it truly in position, to revolve freely between them. The cylinder, 42, has longitudinal strips, 42ª, which connect the front and rear rims, 43—44, with each other, and to the near side of which is secured a series of spirally arranged bars or rods, 42ᵇ, of heavy wire equidistant from each other, to leave sufficient space for the earth to pass between them, but sufficiently near together to detain the potatoes within the cylinder. Spiral plates, 42ᶜ, of sheet metal, extending from the front to the rear of the cylinder, are also secured to the longitudinal strips, 42ᵃ, and are placed at equal distances apart, and in the same direction with the rods, 42ᵇ, but at much greater distances apart, to serve as conveyers, for moving the potatoes with a gradual, progressive movement to the discharge end of the cylinder, which movement is also greatly facilitated by the rearwardly inclined bottom of the cylinder. Spirally arranged fingers, or rods, of iron, 42ᵈ, bolted to the longitudinal strips, 42ᵃ, are located intermediately of the plates or flanges, 42ᶜ, and also extend spirally and rearwardly within the cylinder in the direction of the flanges, 42ᶜ, and terminate at their extremities inside of the inner lines of the said flanges, which serve to direct and carry the weeds, stems, and trash from the surface of the cylinder to the interior thereof, to separate them from the potatoes and carry them rearwardly to the discharge end of the cylinder, from whence they fall upon the ground.

To the rear of the frame bars, 1 and 2, and upon the posts, 4, is secured a semicircular trough, 60, having a discharge spout, 61, upon the left side thereof, as shown in detail, Fig. 8, and a series of rake fingers, 62, secured to the rear end rim, 44, of the cylinder, revolve within the said trough, and carry to the discharge spout, 61, the potatoes, which fall into the trough from the discharge end of the cylinder, the weeds having been carried over and beyond the trough by the fingers, 42ᵈ, which project inside the inner circle thereof and beyond the rear end of the cylinder.

Hooks, 62, upon the spout, support the mouth of the bag, 63, which is suspended therefrom by an attendant standing upon the platform, 64, supported at its rear end by a bracket, 65, secured to the post, 4, and supported at its forward end by a bracket, 66, supported upon the end of the axle, 13, which provides a convenient place for the attendant to stand and drive forward with the machine, and to provide for the reception of the potatoes, which are delivered to the bags in a clean, marketable condition, ready to be tied and dropped upon the ground, to be replaced by another bag as the machine moves forward.

The tire hereinbefore described with its smooth flanged margins, 14ᵇ, and its intermediate serrated periphery, or tread, is well adapted to run both upon smooth and upon rough ground, and will not slip, thus giving ample tractive power to the wheel to operate the rotatable cylinder, the roughened serrations taking into uneven surfaces, and the smooth outer flanges rolling upon smooth ground. An ordinary clutch mechanism shown in Fig. 11 serves to throw the shaft 17 in and out of gear.

Formed integrally and projecting inwardly from the pinions 15ᵇ, which are loose upon the shaft 17, are the hub-clutch projections 15′, and rigidly mounted upon the shaft 17 just inward of the hub-clutches 15′ are the clutch sections 15″.

Pivoted at 16′ to the brackets 16″ secured to the outer sides of the vertical bars 3 are the levers 17′ the lower ends of which are bifurcated and engage the annular grooves 15‴ of the hub-clutches.

The pinions 15ᵇ are designed to be always in engagement with the gear-wheels 15, and when it is desired to operate the elevator and separator mechanism the levers are operated to throw the hub-clutches into engagement with the hub-sections 15″.

To hold the clutches into or out of engagement I provide brackets 18′, which are secured to the outer sides of the vertical bars 3 and a suitable distance above the pivotal points of the levers, and these brackets are formed with the rearwardly extending arms 18″, (Fig. 1) against the outer or inner sides of which, the upper portions of the levers are adapted to rest; these levers being of spring-metal are easily sprung to such position.

The operation of the machine will be readily understood from the foregoing description, and I do not deem it necessary to give a detailed description thereof.

The machine is strong, durable and compact, and may be put together in a workmanlike manner, to run lightly, and with but little friction.

Any of the parts may be easily taken apart for repairs, and duplicate parts may be easily obtained in any well equipped machine shop.

Having described my invention, what I claim as new, and desire to secure by Letters Patent, is—

1. A potato harvesting machine, comprising a wheeled frame, an opening plow and elevator, a conical separating cylinder, and a frame composed of upper longitudinal bars extending and converging from the rear of the machine to the forward axle, lower bars correspondingly converging, extending below the cylinder, cross bars, and vertical end bars for connecting the longitudinal bars and for supporting the friction rollers and shafting, and a rear axle secured to the lower longitudinal bars midway of the length of the cylinder, substantially as described.

2. A potato harvester, comprising a wheeled frame, the conical horizontally revolving separating cylinder, an elevator driven and supported by a shaft at its upper end, geared to the wheel and carrying a sprocket wheel, a chain connecting said wheel with a sprocket wheel upon an upper parallel shaft, and geared to a sprocket wheel carrying a chain which encircles the separating cylinder and gears therewith, substantially as described.

3. In a potato harvesting machine, the combination with a wheeled frame having a rotatable separator, of an elevator-frame having its rear end adjacent to the front open end of the rotatable separator and pivoted to operate vertically, and an arm or lever pivotally connected to the front axle, and diverging link-bars secured to the elevator frame, and pivotally connected to the arm or lever, and means to lift the rear end of the arm or lever to raise the elevator-frame; substantially as set forth.

4. In a potato harvesting machine, the combination with a wheeled frame having a rotatable separator, of an elevator frame having its rear end adjacent to the front open end of the rotatable separator and pivoted to operate vertically, and an arm or lever pivotally connected to the front axle, and diverging and curved link-bars secured to the elevator-frame and pivoted at their front ends to and about midway of the arm or lever, and a cranked rock-shaft, and a vertical link pivotally connecting the rear end of the arm or lever and the crank of the rock-shaft, and means to operate and hold said rock-shaft at any point desired, substantially as set forth.

5. A potato harvester, comprising a rotary conical separating cylinder, supported with its axis horizontal and its expanding rear end inclined downwardly, and a series of blades secured within the cylinder expanding spirally to the rear of the cylinder, and intermediate foraminous cylinder surface for giving continuous endwise movement to the tubers, and sifting the soil therefrom, substantially as described.

6. A potato harvester, comprising the separating cylinder having annular end, or rim, bands, longitudinal strips connecting said bands, spiral blades extending from the front to the rear of the interior of the cylinder, and spiral intermediate rods equidistant from each other and from the said blades, to form a riddle for sifting the soil from the potatoes as they are carried forward by the blades, substantially as described.

7. A potato harvester, comprising the separating cylinder, having an open work casing, spiral blades extending from the forward to the rear end of the cylinder, and correspondingly curved inwardly, inclined tines, or fingers, extending inside the circles of the blades to carry off the stems, stalks, and weeds from the potatoes, substantially as described.

8. A potato harvester, comprising a wheeled frame, a revolving separating cylinder, rake fingers secured to the rear rim, or periphery, of said cylinder, to project rearwardly and outwardly therefrom, and a semicircular trough supported upon the frame in the path of the rake fingers, having a discharge spout upon one side of the machine, substantially as described.

9. A potato harvester, comprising a wheeled frame, a rotatable separator mounted upon the frame, a discharge trough at the rear end of the separator, and a platform supported at the rear end of the separator, and outward of one of the drive-wheels and consisting of a bracket 65, secured to the framework, and a bracket 66 secured to the end of the axle, and a board resting upon the horizontal arms of said brackets, substantially as set forth.

In testimony whereof I affix my signature in the presence of two witnesses.

HENRY C. WILSON.

Witnesses:
WILLIAM R. HOLMAN,
MAUD FITZPATRICK.